Figure 1:
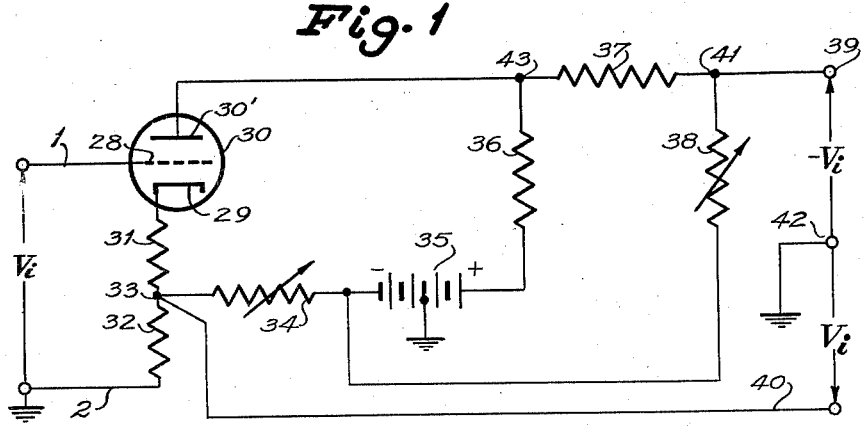

Aug. 1, 1950          E. L. GINZTON          2,516,865

ELECTRONIC BALANCING AND FOLLOWER CIRCUITS

Original Filed March 15, 1943

INVENTOR
EDWARD L. GINZTON
BY
ATTORNEY

Patented Aug. 1, 1950

2,516,865

UNITED STATES PATENT OFFICE 2,516,865

ELECTRONIC BALANCING AND FOLLOWER CIRCUITS

Edward L. Ginzton, Garden City, N. Y., assignor to The Sperry Corporation, a corporation of Delaware Application November 11, 1943, Serial No. 509,867, which is a division of application Serial No. 479,294, March 15, 1943. Divided and this application May 18, 1945, Serial No. 594,571

12 Claims. (Cl. 179—171)

This invention relates generally to electronic balancing and follower circuits, and the present application is a division of copending application Serial No. 509,867, filed November 11, 1943, now Patent No. 2,485,584, issued October 25, 1949, in the name of Edward L. Ginzton, which is in turn a division of application Serial No. 479,294, filed March 15, 1943, now abandoned.

An object of the invention is to provide electronic circuits for producing a current proportional in magnitude and corresponding in direction, to the polarity and magnitude of a control voltage, without placing any load upon the control voltage.

Another object is to provide improved circuits for producing an output voltage signal which corresponds in magnitude but is reversed in polarity with respect to an input or control signal.

Other objects and advantages will become apparent from the specification, taken in connection with the accompanying drawings wherein the invention is embodied in concrete form.

Figure 2:
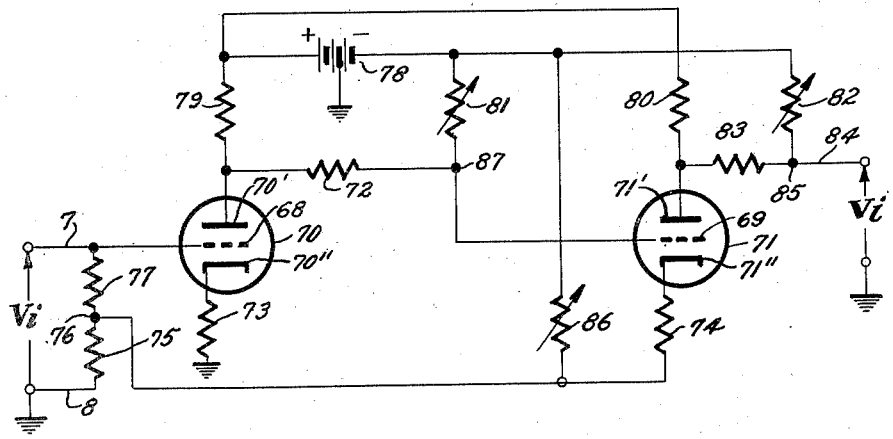

In the drawings,

Fig. 1 is a wiring diagram of an electronic circuit which may be employed for various useful purposes in a computing system; and Fig. 2 is a wiring diagram of a more accurate electronic circuit for accomplishing one of the functions of the circuit shown in Fig. 1.

Referring now to Fig. 1, there is shown a circuit useful in various ways for operating on voltage signals in a computing system. As shown, an electron tube 30, indicated as a triode, is provided, having its grid 28 connected to the ungrounded lead 1 of leads 1 and 2 supplying a direct voltage input signal (V₁). The cathode 29 of tube 30 is connected to the grounded lead 2 through resistors 31 and 32. The point 33 intermediate resistors 31 and 32 is connected through the variable resistor 34 to the negative side of the plate supply voltage, shown as battery 35. Battery 35 is shown grounded at a point intermediate its positive and negative terminals. The plate 30' of tube 30 is connected to the positive side of the plate supply battery through the resistor 36. A closed circuit is formed across the terminals of battery 35 through the resistors 36, 37, and 38, the last of which is variable. One output lead 39 is connected to a point 41 intermediate the resistors 37 and 38. The other output lead 40 is connected to the point 33. A grounded output lead 42 may also be used, if desired.

The electron circuit through the tube may be considered as traveling from ground through resistors 32 and 31, through tube 30 and resistor 36 to the positive side of battery 35, and then back to ground. Another closed circuit is formed from ground through the resistor 32 and variable resistor 34 to the negative side of battery 35 and then to ground.

With zero voltage signal (V₁) applied to the grid 28 of tube 30, that is, with the quiescent value of current flowing through the tube, variable resistor 34 is adjusted until the point 33 and output conductor 40 are at ground potential. At the same time, variable resistor 38 is adjusted until the point 41 and output conductor 39 are at ground potential.

If a positive voltage signal (V₁) should be received, it will be apparent that because of the increase of current flow through resistor 36 the potential of point 43 will decrease. Accordingly, the potential of point 41 and that of the output conductor 39 will decrease to a negative potential proportional to the input voltage signal (V₁). At the same time, due to the increase of current flow through resistor 32, the potential of point 33 and that of the output conductor 40 will increase in the positive direction by a corresponding amount. Similarly, should a negative voltage signal be received, a proportional positive signal will be produced on output lead 39 and a proportional negative signal will be produced on lead 40.

Moreover, due to an increase of current flow through resistors 32 and 31 resulting from a positive input signal impressed upon the grid, the cathode of tube 30 will become more positive, causing the grid to become more negative with respect to the cathode. This will tend to decrease the current flow through the tube, thus opposing the effect of the received signal. In this way, inverse feedback is provided which stabilizes the ratio of output to input voltage signals by eliminating the effects of changes in the tube characteristics caused by age of the tube, variations in external conditions, such as temperature and humidity, and other reasons.

The circuit shown in Fig. 1 may therefore be used for three different purposes. It may be used as a "follower" circuit in which an output voltage signal is provided across output conductors 40 and 42, which is of the same polarity and proportional to the input signal (V₁). Such a follower circuit may be employed in order to produce an output voltage signal from which current may be drawn, said output voltage signal being proportional to an input voltage signal from which it is not desired to draw current. The circuit shown in Fig. 1 may also be employed as a "reversing" circuit wherein an output voltage signal may be obtained across output conductors 39 and 42 proportional in magnitude to the input signal but of opposite polarity. By utilizing both the output conductors 39 and 40 and the grounded conductor 42, the circuit may be employed as a "balancing circuit" wherein two voltage signals are obtained, both of which are proportional to the input signal, one being of the same polarity and the other being of the opposite polarity to that of the input signal.

If a more accurate follower circuit than that shown in Fig. 1 is desired, recourse may be had to the circuit shown in Fig. 2. As there shown, two electron tubes 70, 71 are provided. The grid 68 of tube 70 is connected by lead 7 to the ungrounded side of the input signal ($V_1$), whereas the grid 69 of tube 71 is connected to the plate 70' of tube 70 through the resistor 72. The cathode 70" of tube 70 is connected to ground through the biasing resistor 73, whereas the cathode 71" of tube 71 is connected to ground through the biasing resistor 74, the inverse feed-back resistor 75 and input voltage lead 8. The ungrounded side of the input signal is connected to the point 76 intermediate resistors 74 and 75, through the resistor 77.

The positive side of the plate supply battery 78 is directly connected to the plates 70' and 71' of tubes 70 and 71 through resistors 79 and 80, respectively. As shown, battery 78 is connected to ground at a point intermediate its positive and negative terminals. Its negative terminal is connected to the plate of tube 70 through variable resistor 81 and resistor 72. The negative terminal is also connected to the plate of tube 71 through the resistors 82 and 83, the first of which is variable. The output voltage signal appearing on conductor 84 is obtained from a point 85 intermediate resistors 82 and 83. Another variable resistor 86 is provided, one end of which is connected to the negative terminal of battery 78 and the other end of which is connected to the point 76.

With the quiescent value of tube current flowing, that is, with zero input signal ($V_1$), resistors 81, 82 and 86 are all adjusted so that the points 87, 85 and 76, respectively, are each at ground potential. Accordingly, no voltage output signal will appear on lead 84 when zero input signal is received.

Should a positive voltage input signal ($V_1$) be applied to the grid of tube 70, the current through the tube will increase above its normal or quiescent value. The resulting increased potential drop across resistor 79 will lower the potential of the plate of tube 70 and, consequently, of the point 87 and the grid of tube 71. The resulting decrease in current flow through tube 71 and resistor 80 will cause a corresponding increase in the potential of the plate of tube 71, and consequently of point 85 and of output lead 84. Should a negative input voltage signal be received, an exactly opposite sequence of the events will occur, causing a corresponding negative voltage signal to appear on output lead 84. Thus, the output signal produced will always be proportional to, and of the same polarity as, the input signal received.

The advantage of this follower circuit lies in the increased amount of inverse feedback obtained by employing two stages. Inverse feedback is obtained in the circuit of tube 70 through the biasing resistor 73. As the current through tube 70 increases due to a positive voltage signal, the increased potential drop through the resistor will cause an increase in potential of the cathode of tube 70. Accordingly, the grid of tube 70 will become less positive with respect to the cathode, thereby tending to decrease the current flow in the tube and opposing the increase caused by the positive input signal. Similarly, as the current flow through tube 71 decreases as a result of a positive input voltage signal (as previously explained) the potential drop through the resistors 74 and 75 will also decrease, causing the cathode of tube 71 to become less positive. The grid of tube 71 is thereby caused to become more positive with respect to the cathode, causing an increase in current flow through tube 71, which tends to oppose the decrease in current flow caused by the positive voltage input signal. By employing inverse feedback in this way, in both stages of the circuit, the output voltage signal is rendered almost completely independent of changes in the tube characteristics, and dependent only on the input voltage signal ($V_1$). If desired, the circuit of Fig. 2 could also be used as a "reversing" circuit or a "balancing" circuit by also extracting the potential of point 76.

Although direct current voltage signals have been employed throughout for the purpose of illustration, it will be apparent that many of the principles embodied in the present invention could obviously be employed to operate in a similar manner on alternate current voltage signals. It is therefore to be understood the present invention is not intended to be limited to the use of direct current voltage signals only.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electronic follower circuit for producing a loadable output signal voltage proportional to a non-loadable input signal voltage, comprising an electron tube having a control grid adapted to be connected to receive one side of said input signal voltage, a plate supply voltage source for said tube, a pair of resistors connected so as to be interposed between the cathode of said tube and the other side of said input signal voltage, a third resistor interposed between a point intermediate said pair of resistors and the negative side of said voltage source, said third resistor having an ohmic value such as to cause the voltage between said intermediate point and said other side of said input signal voltage to be zero when said input voltage is zero, and means for extracting the voltage between said intermediate point and said other side of said input signal voltage as the output signal voltage.

2. An electronic follower circuit for producing a loadable output signal voltage proportional to a non-loadable input signal voltage, comprising a first and second electron tube having plate and cathode circuits, the control grid of the first of said tubes being arranged to be energized with said input voltage, a common plate supply voltage source for said tubes, said source having an intermediate point grounded, two closed resistive circuits also energized from said source, a common resistor in the first of said circuits and in the plate circuit of said first tube, a second common resistor in the second of said circuits and in the plate circuit of said second tube, means for adjusting one point in each of said resistive circuits to have zero voltage when said input voltage is to zero, means for energizing the control grid of said second tube from the voltage of said point in said first resistive circuit, and means for extracting the voltage of said point in said second resistive circuit as the output voltage.

3. An electronic follower circuit, as claimed in claim 2, further including an inverse feed-back resistor in the cathode circuits of each of said tubes.

4. An electronic follower circuit for producing a loadable output signal voltage proportional to a non-loadable input signal voltage, comprising first and second electron tubes having plate and cathode circuits, the first of said tubes having a control grid arranged to be connected so as to be energized with said input signal voltage, a common plate supply voltage source for said tubes, two closed electrical circuits also energized from said source, the first of said electrical circuits including an impedance element in common with the plate circuit of said first tube, and means for causing the voltage between a point in said first circuit and one side of said input voltage to be zero when said input voltage is zero, said second electrical circuit including an impedance element in common with the plate circuit of said second tube, and means for causing the voltage between a point in said second circuit and said point in said first circuit to be zero when said input voltage is zero, the second of said tubes having a control grid connected to said point in said first circuit, and means for extracting the voltage between said point in said second circuit and the other side of said input voltage, as the output signal voltage.

5. An electronic follower circuit, as claimed in claim 4, further including an inverse feed-back impedance element in the cathode circuits of said tubes.

6. An electronic reversing circuit for supplying an output signal voltage proportional but of opposite polarity to a received input signal voltage, comprising an electron tube having a control grid arranged to be energized with said received voltage, a plate supply voltage source for said tube, said source having an intermediate point grounded, a closed resistive circuit energized from said source, a common resistor in said resistive circuit and in the plate circuit of said tube, means for adjusting the voltage of a point in said resistive circuit to have zero voltage when said received voltage is zero, means for extracting the voltage of said point, and a pair of resistors connected in series with each other between the cathode of said tube and ground, and a further resistor connected from the junction between said pair of resistors to the negative terminal of said plate supply voltage source.

7. An electronic reversing circuit for supplying an output signal voltage proportional but of opposite sense to a received input signal voltage, comprising an electron tube having a control grid arranged to be energized with said input voltage, a plate supply voltage source for said tube, a closed electrical circuit energized from said source, a common impedance element in said electrical circuit and in the plate circuit of said tube, means in said electrical circuit for causing the voltage between a point in said electrical circuit and one side of said input signal voltage to be zero when said input signal voltage is zero, and means for extracting the voltage between said point and said one side of said input signal voltage as the output signal voltage, and a pair of resistors connected in series with each other between the cathode of said tube and ground, and a further resistor connected from the junction between said pair of resistors to the negative terminal of said plate supply voltage source.

8. An electronic reversing circuit for supplying an output signal voltage proportional but of opposite polarity to a received input signal voltage, comprising an electron tube having a control grid arranged to be energized from one side of the source of input signal voltage, a plate supply voltage source for said tube, a closed resistive circuit energized from said plate supply source, said resistive circuit including a resistive element connected between the positive side of said source and the plate of said tube and means for causing the voltage between a point in said resistive circuit and one side of said input signal voltage source to be zero when said input voltage is zero, and means for extracting the voltage between said point and said one side of said input voltage source as the output signal voltage, and a pair of resistors connected in series with each other between the cathode of said tube and ground, and a further resistor connected from the junction between said pair of resistors to the negative terminal of said plate supply voltage source.

9. An electronic reversing circuit for supplying an output signal voltage proportional but of opposite polarity to a received input signal voltage, comprising an electron tube having a control grid arranged to be energized with said input voltage, a plate supply voltage source for said tube, a closed resistive circuit energized from said source, said resistive circuit including a resistive element connected between the positive side of said source and the plate of said tube and means for causing the voltage between a point in said resistive circuit and one side of said input voltage to be zero when said input voltage is zero, means for extracting the voltage between said point and said one side of said input voltage as the output signal voltage, inverse feed-back means including a pair of resistors connected in series with each other between the cathode of said tube and ground, and a further resistor connected from the junction between said pair of resistors to the negative terminal of said plate supply voltage source.

10. An electronic balancing circuit for supplying two output signal voltages above and below ground respectively by an amount proportional to a received input signal voltage, comprising an electron tube having a control grid arranged to be energized with said received voltage, a plate supply voltage source for said tube, said source having an intermediate point grounded, two closed resistive circuits energized from said source, the first of said circuits being connected between the extreme positive and negative terminals of said source, and including a resistor in common with the plate circuit of said tube, and the second of said circuits being connected between said intermediate point and the negative terminal of said source, and including a resistor in common with the cathode circuit of said tube, means for adjusting a point in the first of said resistive circuits to have zero voltage when said input voltage is zero, means for adjusting a point in the second of said circuits to also have zero voltage when said input voltage is zero, and means for extracting the voltage of each of said points.

11. An electronic balancing circuit for supplying two output signal voltages of opposite polarity both proportional to an input signal voltage comprising an electron tube having its grid arranged to be energized with said input voltage, a plate supply voltage source for said tube, two closed resistive circuits energized from said source, the first of said circuits including being connected between the extreme positive and negative terminals of said source and a resistive element in common with the plate circuit of said tube, and the second of said circuits being connected between said intermediate point and the negative terminal of said source, and including a resistive element in common with the cathode circuit of said tube, means in each of said circuits for causing the respective voltages between one side of said input voltage and respective points in said circuits to be zero when said input voltage is zero, and means for extracting the respective voltages between said one side of said input voltage and said respective points as the respective output signal voltages.

12. An electronic balancing circuit for supplying two output signal voltages of opposite polarity both proportional to an input signal voltage, comprising an electron tube having its grid arranged to be energized with said input voltage, a plate supply voltage source for said tube, two closed resistive circuits energized from said source, the first of said circuits being connected between the extreme positive and negative terminals of said source, and including a resistive element in common with the plate circuit of said tube, and the second of said circuits being connected between said intermediate point and the negative terminal of said source and including a resistive element in common with the cathode circuit of said tube, means in each of said circuits for causing the respective voltages between one side of said input voltage and respective points in said circuits to be zero when said input voltage is zero, means for extracting the respective voltages between said one side of said input voltage and said respective points as the respective output signal voltages, a further resistor connected between the cathode of said tube and said point in said second of said resistive circuits.

EDWARD L. GINZTON.

REFERENCES CITED

The following references are of record in the file of this patent:

UNITED STATES PATENTS

| Number | Name | Date |
| --- | --- | --- |
| 2,151,917 | Hyland | Mar. 28, 1939 |
| 2,172,395 | McSpadden | Sept. 12, 1939 |
| 2,208,379 | Luck | July 16, 1940 |
| 2,237,604 | Marique | Apr. 8, 1941 |
| 2,240,635 | Avins | May 6, 1941 |
| 2,284,064 | Morgan | May 26, 1942 |
| 2,287,334 | White | June 23, 1942 |
| 2,383,351 | Smith | Aug. 21, 1945 |
| 2,390,824 | Berry | Dec. 11, 1945 |
| 2,397,961 | Harris Jr. | Apr. 9, 1946 |
| 2,404,011 | White | July 16, 1946 |
| 2,404,387 | Lovell et al. | July 23, 1946 |
| 2,428,541 | Bagley | Oct. 7, 1947 |